United States Patent [19]

Yamaguchi

[11] Patent Number: 5,105,117
[45] Date of Patent: Apr. 14, 1992

[54] ULTRASONIC MOTOR

[75] Inventor: Masaki Yamaguchi, Gifu, Japan

[73] Assignee: Brother Kogyo Kabushiki Kaisha, Aichi, Japan

[21] Appl. No.: 602,785

[22] Filed: Oct. 24, 1990

[30] Foreign Application Priority Data

Oct. 31, 1989 [JP] Japan ................... 1-283472
Oct. 31, 1989 [JP] Japan ................... 1-283490

[51] Int. Cl.⁵ .............................. H01L 41/08
[52] U.S. Cl. ............................. 310/323; 310/328
[58] Field of Search ............................ 310/323, 328

[56] References Cited

U.S. PATENT DOCUMENTS

| | | | |
|---|---|---|---|
| 3,154,700 | 8/1964 | McNaney | 310/323 |
| 3,171,696 | 3/1965 | Houghton | 310/323 |
| 3,246,608 | 11/1966 | Cooper | 310/323 |
| 4,163,168 | 1/1979 | Ishikawa et al. | 310/323 |
| 4,607,166 | 7/1986 | Tamaki | 310/323 |
| 4,613,782 | 9/1986 | Mori et al. | 310/323 |
| 4,672,256 | 11/1987 | Okuno et al. | 310/323 |
| 4,692,652 | 12/1987 | Seki et al. | 310/323 |
| 4,708,600 | 12/1987 | AduJudom, II et al. | 310/323 |
| 4,742,260 | 5/1988 | Shimizu et al. | 310/323 |
| 4,743,788 | 8/1988 | Takagi et al. | 310/323 |
| 4,894,579 | 1/1990 | Higuchi et al. | 310/323 |
| 4,912,351 | 3/1990 | Takata et al. | 310/323 |
| 4,928,030 | 3/1990 | Culp | 310/323 |
| 4,939,404 | 7/1990 | Imagaki et al. | 310/323 |
| 4,949,077 | 4/1990 | Murata et al. | 310/323 |
| 4,950,135 | 4/1990 | Tojo et al. | 310/323 |

FOREIGN PATENT DOCUMENTS

| | | | |
|---|---|---|---|
| 0231461 | 12/1985 | Fed. Rep. of Germany | 310/323 |
| 60-234476 | 6/1985 | Japan . | |
| 0185081 | 8/1986 | Japan | 310/323 |
| 62-48252 | 8/1987 | Japan . | |
| 63-244205 | 1/1988 | Japan . | |
| 0039474 | 2/1988 | Japan | 310/323 |
| 63-133877 | 2/1988 | Japan . | |
| 0277477 | 11/1988 | Japan | 310/323 |
| 0126178 | 5/1989 | Japan | 310/323 |
| 0198284 | 8/1989 | Japan | 310/323 |
| 0026282 | 1/1990 | Japan | 310/323 |
| 548912 | 4/1977 | U.S.S.R. . | |
| 777727 | 6/1980 | U.S.S.R. . | |

OTHER PUBLICATIONS

Ultrasonic Motors Using Piezoelectric Ceramic Multi--Mode Vibrators Takano et al., Dept. of Communication Engineering, Tohoku Inst. 12/87.

Primary Examiner—Mark O. Budd
Attorney, Agent, or Firm—Oliff & Berridge

[57] ABSTRACT

This is an ultrasonic motor having a drive unit of low elastic modulus disposed between an ultrasonic vibrator and a mover so as to prevent noise or unnecessary vibration originating from friction on a sliding surface. Moreover, providing a drive unit of plastic and of a particular thermal conductivity enables highly efficient and stabilized motion for long hours and stable driving characteristics.

20 Claims, 1 Drawing Sheet

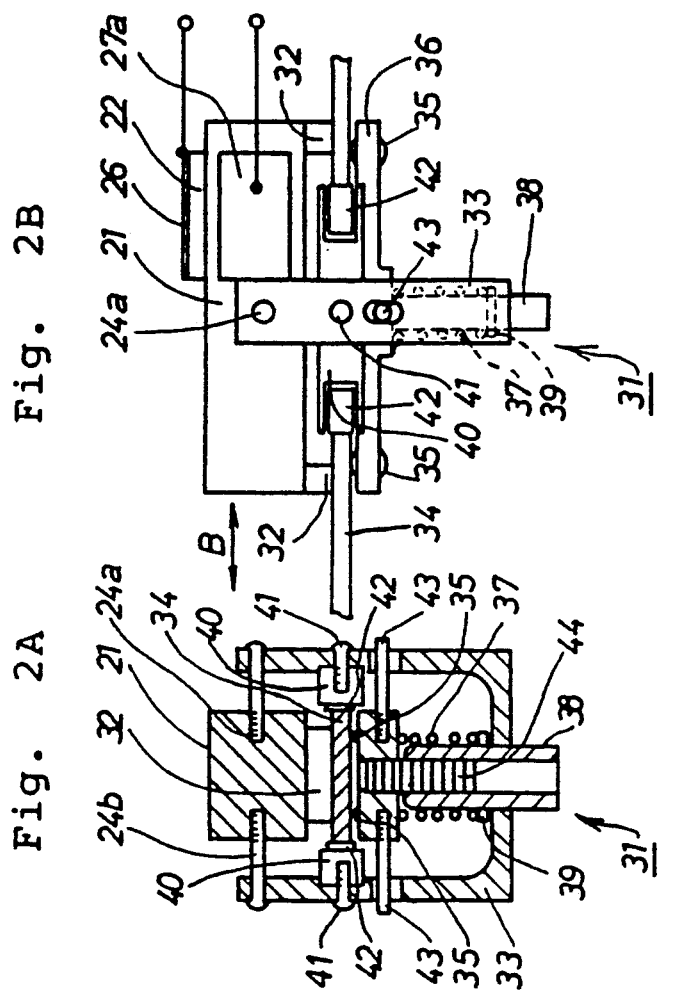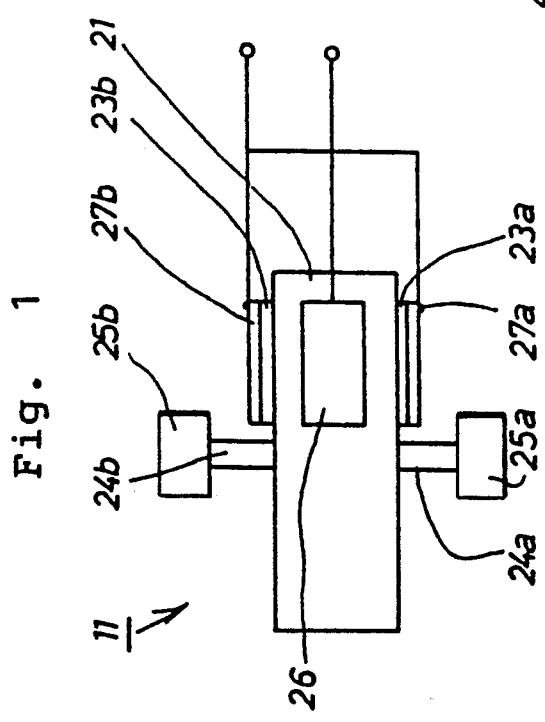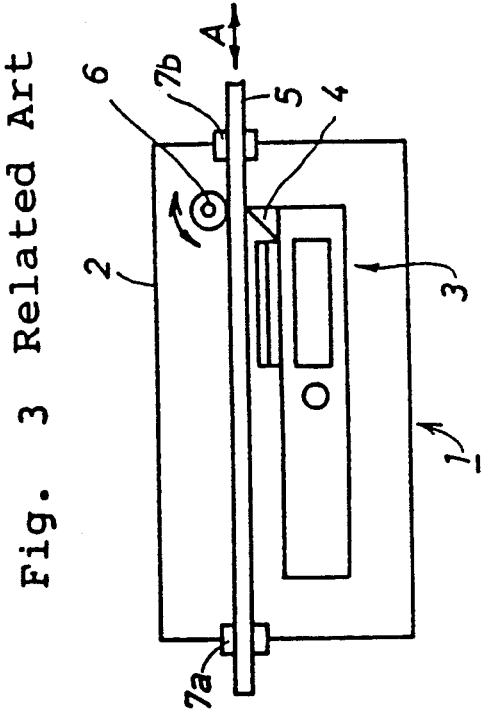

ULTRASONIC MOTOR

BACKGROUND OF THE INVENTION

The invention relates to an ultrasonic motor, especially the prevention of noise generated in the ultrasonic motor and the prevention of heat generated due to mechanical loss from being transmitted to an ultrasonic vibrator.

Ultrasonic motors are known in the art and broadly classified into travelling-wave types and standing-wave types. The principle of operation of the standing-wave type ultrasonic motor is to abut a moving member, with specified pressure, against an ultrasonic vibrator excited substantially in elliptical movement so as to drive the moving member by a frictional force between contact points on the ultrasonic vibrator, which are elliptically vibrating, and the moving member.

An example of such motors is disclosed in Japanese Patent Application No. H1-46866. As shown in FIG. 3, a linear ultrasonic motor 1 includes an ultrasonic vibrator 3 attached to a yoke 2. At one end of the vibrator 3, there is formed a drive unit 4. A moving member 5 is pressed against the drive unit 4 by a rubber roller 6. The moving member 5 is supported by linear bearings 7a and 7b, which are secured to the yoke 2. When the vibrator 3 is excited, the moving member 5 moves in a direction shown by an arrow A, being driven by elliptical vibration. This force is caused by frictional force between the drive unit 4 and the moving member 5.

In the above ultrasonic motor, a great pressing force is required for obtaining a large output on the sliding surface between the output end portion of the ultrasonic vibrator and the mover. In the ultrasonic motor, however, which utilizes substantially an elliptical vibration, velocity difference between the ultrasonic vibrator and the mover are inevitably produced resulting in the generation of noise or unnecessary vibration due to repetition of high-speed sliding.

Furthermore, most of the driving loss is mechanical loss on the sliding surface between the ultrasonic 3 and the moving 5 member. This lost energy becomes heat. Subsequently, the electromechanical conversion element, which is the source of exciting the ultrasonic vibrator, comprising piezoelectric elements or the like, is heated, resulting in deterioration of its performance or a change in the resonance frequency of the vibrator itself.

Wherefore, one object of this invention is to prevent the above-described noise or unnecessary vibration originating from friction on the sliding surface in standing wave ultrasonic motors.

Another object of this invention is to provide a standing wave ultrasonic motor which enables stabilized and high efficiency operation for long hours by preventing the heat produced by mechanical loss from being transmitting into the ultrasonic vibrator.

Other objects and benefits of the invention will become apparent from the detailed description which follows hereinafter when taken in conjunction with the drawing figures which accompany it.

SUMMARY OF THE INVENTION

In order to accomplish the above objects, there are provided driving units of less than 2000 kgf/mm$^2$ of elastic modulus between the first and second elastic bodies.

In order to accomplish the above objects, there is also provided driving units of less than $1 \cdot 10^{-3}$ [cal/(°C/cm·cm$^2$·s)] of thermal conductivity at room temperature at the side of the first elastic body between the first and second elastic bodies. Drive units made of plastic is used in this case.

BRIEF DESCRIPTION OF THE DRAWINGS

FIG. 1 is a view of a preferred ultrasonic vibrator employed in a linear ultrasonic motor according to this invention;

FIG. 2A is a cutaway end view of a linear ultrasonic motor according to this invention utilizing the above ultrasonic vibrator in a vertical plane through the center thereof;

FIG. 2B is a side view of the linear ultrasonic motor of FIG. 2A; and,

FIG. 3 is a view of a related art ultrasonic motor.

DETAILED DESCRIPTION OF THE PREFERRED EMBODIMENT:

A preferred embodiment of this invention will now be described with particular reference to FIGS. 1 and 2. In this invention, a sliding member is interposed and press-contacted between an ultrasonic vibrator and a mover. The ultrasonic vibrator is the one proposed in the Specification and Drawings of the Japanese Patent Application No. 1-46866 and includes a mechanical resonator. Thus, the ultrasonic vibrator, per se, forms no part of the novelty of this invention; but, use of the indicated ultrasonic vibrator provides superior performance and is, therefore, preferred.

First, the ultrasonic vibrator of the ultrasonic motor of this invention will be explained. As shown in FIGS. 1 and 2B in the ultrasonic vibrator 11, a first piezoelectric body 22 is provided on the upper surface of an elastomer 21 with a shape of rectangular plate for exciting flexural vibration of the elastomer 21. On the side surfaces of the elastomer 21 transverse to the first piezoelectric body 22, second piezoelectric bodies 23a and 23b are provided for exciting longitudinal vibration on the elastomer 21.

The center of the elastomer 21 in a longitudinal direction is secured by fixing bolts 24a and 24b. On the upper surface of the piezoelectric bodies 22, 23a, 23b are attached electrodes 26, 27a, 27b respectively. The elastomer 21 itself is a grounding electrode and is grounded to a base 25a and, that is part of a support member 33, via the above-described fixing bolts 24a and 24b.

Furthermore, the shape and dimensions of the elastomer 21 are chosen such that the elastomer 21 transversely vibrates in its thickness direction with a specified frequency, f, and in the secondary mode of the free ends at both ends and longitudinally vibrates in its longitudinal direction with the same frequency, f, and in the primary mode of the free ends at both ends.

Generally, the number of resonance frequencies of the longitudinal vibration propagating in the elastomer depends on the length of the elastomer. The number of resonance frequencies of the flexural vibration in the thickness direction depends on the length and thickness of the elastomer. Accordingly, designing the elastomer 21 is simple and can be accomplished by those skilled in the art without undue experimentation so that the details of such design are omitted here in the interest of simplicity and the avoidance of redundancy.

The operation of the ultrasonic vibrator 11 constructed as above will now be explained in detail.

First, the first piezoelectric body 22 is caused to vibrate by an alternating voltage of the specified frequency, f. The elastomer 21 resonates in the secondary mode of the flexural vibration, thus exciting its standing wave.

Next, the second piezoelectric bodies 23a and 23b are caused to vibrate by an alternating voltage of the specified frequency, f. The elastomer 21 vibrates in a longitudinal vibration of the primary mode, exciting a standing wave. In other words, the positions fixed by the fixing bolts 24a and 24b are the nodes of each standing wave.

Desired shapes of elliptical vibration are obtained by adjusting the amplitude and phase of the voltage applied on the first piezoelectric body 22 and the second piezoelectric bodies 23a and 23b.

In the above embodiment, the ultrasonic vibrator produces substantially an elliptical vibration composed of excitation of the longitudinal vibration primary mode and the flexural vibration secondary mode. Various combination of longitudinal, flexural, shear or torsional vibrations may be considered and higher-degree modes may be used.

The construction of the linear ultrasonic motor of this invention using the above-described preferred ultrasonic vibrator 11 will now be explained with reference to FIG. 2. Components in common with those described with respect to FIG. 1 are designated with the same identifying numbers in both figures.

Drive units 32 are provided at both ends of the ultrasonic vibrator 11 because the ends provide the largest amplitude of longitudinal vibration. The drive units 32 are pressed against the sliding member or rail 34 supported via the fixing bolts 24a and 24b by the support member 33.

The mechanism to give pressure comprises a guide 36 disposed between the sliding member 34 and the support member 33 and including roller bearings 35, a coil spring 37, a spring guide 38, and a spring presser 39. The spring presser 39 adjusts pressure by rotating along a threaded groove (not shown) formed on the outer surface of the spring guide 38 so as to vary the length of the coil spring 37.

On the other hand, a second guide 40 is secured on the support member 33 via bolts 41 in order to prevent side-slipping of the sliding member 34. The second guide 40 holds the sliding member 34 via roller bearings 42. Moreover, a first support member 43 and a second support member 44 are provided for prevention of yawing and rolling.

When the linear ultrasonic motor 31 constructed as above has an alternating electric signal with the designated frequency, f, applied thereto, substantially an elliptical vibration occurs at the drive units 32. The motor moves in a direction as shown by the arrow B, being driven by the frictional force with the sliding member 34.

In the preferred embodiment, the above-stated drive units 32 are made of a material having an elastic modulus less than 2000 kg/mm$^2$. Such a material in a tested embodiment comprised phenolic resin dispersed with carbon or glass fibers and with dimensions of 16 mm long, 3 mm wide, and 5 mm high. It was attached to the elastic body 21 using an epoxy resin which possessed an elastic modulus near to that of the elastic body 21. The preferred material for the sliding member 34 is a metal such as aluminum, iron, brass, or the like, or ceramic.

In the tested embodiment, driving the linear ultrasonic motor 31 with a pressing force P=1.32 kgf by the coil spring 37 and an electrical input of W=4.91 watt at a resonance frequency f=27.255 kHz generated the starting thrust of 0.26 kgf at a velocity of 0.26 m/s without any noise due to the friction between the drive units 32 and the sliding member 34. For comparison, a drive units 32 made of iron S45C and driven under virtually the same condition as above, resulted in a wide range of generated noise from tens of hertz through several kilohertz as well as an unstable velocity. This is assumed to be because the change of the velocity difference between the ultrasonic vibrator 11 and the sliding member 34 is not reduced due to mechanical deformation of the drive units 32, resulting in the production of unnecessary vibration.

As a result of actual tests conducted on various materials and combinations, it was found that noise from the motor and non-uniformity of the driving velocity can be prevented if the drive units 32 are made of a material having an elastic modulus less than 2000 kgf/mm$^2$. Likewise, the material of the drive units 32 is preferably of a low elastic modulus. Thermosetting plastics such as urea resin, melamine resin, acrylic resin, furan resin, and epoxy resin or thermoplastics such as polybutenete-rephthalate, polyamide-imido, nylon, polycarbonate, and polyacetal can be used quite effectively.

In a second embodiment, the drive units 32 were made of a material having a thermal conductivity at room temperature less than $1 \cdot 10^{-3}$ [cal/(°C/cm·cm$^2$·s)] such as phenol resin. In a successfully tested version of this embodiment, the drive units 32 were 16 mm long, 3 mm wide, and 5 mm high. The thermal conductivity is a physical quantity defined by the ratio between the calorie passing the unit area (cm$^2$) of the isothermal surface inside the physical body and flowing intersect the isothermal surface at the unit hour (s) and the temperature gradient (°C/cm) in that direction. Usually, for example, the thermal conductivity of porcelain is $3.0-4.1 \cdot 10^{-3}$ [cal/(°C/cm·cm$^2$·s)] and that of iron is $0.24$[cal/(°C/cm·cm$^2$·s)]. In this same second embodiment, the preferred material of the sliding member 34 is a metal such as iron or ferro-alloy, or a ceramic. In tested embodiments according to this approach to drive the linear ultrasonic motor 31, the temperature of the ultrasonic vibrator 11 scarcely rose as heat dissipation occurred at the rail 34.

As a result of examining the above, it was found out if the drive units 32 are made of a material less than $1 \cdot 10^{-3}$ [cal/(°C/cm·cm$^2$·s)] in its thermal conductivity, the motion of the ultrasonic motor is stabilized.

Almost all of the plastics such as the thermosetting resin such as phenol, urea, epoxy, polyimido or the thermal plastics such as polyamido, nylon, polyphenylenesulfite can be used successfully to achieve desired objects such as durability and responsiveness.

This invention is not intended to be limited to the above-described specific embodiments. Various modifications may be made without deviating from the scope and spirit of this invention. For example, electrostrictive or magnetostrictive elements can be used as long as mechanical vibration can be converted into electric vibration.

In the above embodiments, the particular preferred ultrasonic vibrator exciting standing-wave vibration was used; but, one exciting traveling waves can be used. The shape of the ultrasonic vibrator is not limited to a plate as depicted. A square, bar, disc, cylinder or annular ring could be used with equal effectiveness, if desired.

Wherefore, having thus described the invention, what is claimed is:

1. In a linear ultrasonic motor wherein a sliding member is supported for linear motion and driven by a contacting drive unit vibrated by an ultrasonic vibrator, the improvement comprising:

said drive unit further comprising a pair of drive elements;

a sliding member having a first portion disposed under a first one of said pair of drive elements and a second portion disposed under a second one of said pair of drive elements;

a spring-biased member for pushing said sliding member upward against said pair of drive elements, said spring-biased member further comprising roller bearing means for supporting longitudinal movement of said first portion and said second portion; and means for preventing side slipping of said sliding member.

2. The improvement to the linear ultrasonic motor of claim 1, further comprising:

a support member; and said means for preventing side slipping comprises a guide secured to said support member on each side of said sliding member, said guide on each side of said sliding member having at least one roller bearing in contact with said sliding member.

3. The improvement to a linear ultrasonic motor of claim 1 wherein:

the drive unit is of a material having a thermal conductivity at room temperature of $1 \cdot 10^{-3}$ [cal/(°C/cm·cm²·s)].

4. The improvement to a linear ultrasonic motor of claim 1 wherein:

the base material of the drive unit is made of a material having a thermal conductivity in at room temperature of less than $1.10^{-3}$ [cal/°C/cm·cm²·s)].

5. The improvement to a linear ultrasonic motor of claim 4 wherein:

the base material of the drive unit is a phenolic resin.

6. The improvement to a linear ultrasonic motor of claim 1 wherein:

the drive unit is made of a plastic material.

7. The improvement to a linear ultrasonic motor of claim 1 wherein:

the drive unit is of a low elastic modulus material chosen from the group consisting of thermosetting plastics including phenolic resin, urea resin, melamine resin, acrylic resin, furan resin, and epoxy resin and thermoplastics including polyamide-imido, nylon, polycarbonate, polybuteneterephthalate, and polyacetal.

8. The improvement to a linear ultrasonic motor of claim 1 wherein said pair of drive elements are disposed on opposite ends of a longitudinal ultrasonic vibrator.

9. The improvement to a linear ultrasonic motor of claim 1 wherein said spring-biased member includes a spring and means for adjusting a force of said spring biasing the sliding member against said pair of drive elements.

10. The improvement to a linear ultrasonic motor of claim 1 and additionally comprising:

means for preventing yawing and rolling of said sliding member.

11. The improvement to the linear ultrasonic motor of claim 2, further comprising a means for preventing yawing and rolling having:

a pin extending from each side of said spring-biased member to be engaged in a paired slot in said support member; and a post extending perpendicular to said spring-biased member from a center point of said spring-biased member at a side opposite to the ultrasonic vibrator, said post seated in a guide extending from a base of said support member.

12. In a linear ultrasonic motor wherein a sliding member is supported for linear motion and driven by a contacting drive unit vibrated by an ultrasonic vibrator, the improvement comprising:

the drive unit further comprising a pair of drive elements disposed on opposite ends of a longitudinal ultrasonic vibrator;

a spring-biased member disposed for pushing said sliding member upward against said pair of drive elements, said sliding member having a first portion disposed under a first one of said pair of drive elements and a second portion disposed under a second one of said pair of drive elements and said spring-biased member further comprises roller bearing means for supporting longitudinal movement of said first portion and said second portion;

means for preventing yawing and rolling of said sling member; and means for preventing side slipping of said sliding member.

13. The improvement to a linear ultrasonic motor of claim 12 wherein:

the drive unit has an elastic modulus of less than 2000 kgf/mm².

14. The improvement to a linear ultrasonic motor of claim 12 wherein:

the base material of the drive unit is made of a material having a thermal conductivity at room temperature of less than $1 \cdot 10^{-3}$[cal/(°C/cm·cm²·s)].

15. The improvement to a linear ultrasonic motor of claim 12 wherein:

the drive unit is of a low elastic modulus material chosen from the group consisting of thermosetting plastics including phenolic resin, urea resin, melamine resin, acrylic resin, furan resin, and epoxy resin and thermoplastics including polyamide-imido, nylon, polycarbonate, polybuteneterephthalate, and polyacetal.

16. The improvement to a linear ultrasonic motor of claim 15 wherein:

said spring-biased member includes a spring and means for adjusting a force of said spring biasing the sliding member against said pair of drive elements.

17. The improvement to the linear ultrasonic motor of claim 12, further comprising:

a support member; and said means for preventing side slipping comprises a guide secured to said support member on each side of said sliding member, said guide on each side of said sliding member having at least one roller bearing in contact with said sliding member.

18. The improvement to the linear ultrasonic motor of claim 17, wherein said means for preventing yawing and rolling comprises:

a pin extending from each side of said spring-biased member to be engaged in a paired slot in said support member; and a post extending perpendicular to said spring-biased member from a center point of said spring-biased member at a side opposite to the ultrasonic vibrator, said post seated in a guide extending from a base of said support member.

19. The improvement to the linear ultrasonic motor of claim 12, wherein the base material of the drive unit is a phenolic resin.

20. In a linear ultrasonic motor wherein a sliding member is supported for linear motion and driven by a contacting drive unit vibrated by an ultrasonic vibrator, the improvement comprising:

said drive unit further comprising at least one drive element, and the sliding member having a portion disposed under said at least one drive element;

a spring-biased member for pushing the sliding member upward against said at least one drive element, said spring-biased member further comprising roller bearing means for supporting longitudinal movement of said portion;

means for preventing yawning and rolling of the sliding member; and means for preventing slide slipping of the sliding member.

* * * * *